D. W. DE FOREST.
Whiffletree.
No 69,546.
Patented Oct. 8, 1867.
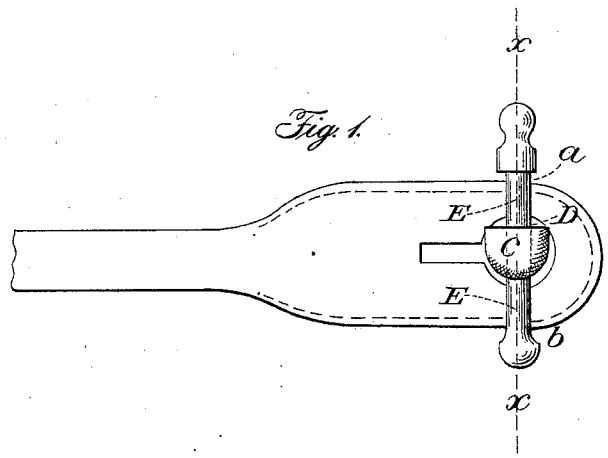
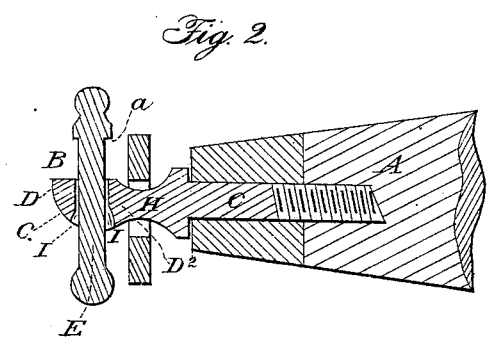
Witnesses:
Theo Tusche
W. Trevin
Inventor:
D. H. De Forest
Per Munn & Co
Attorneys

United States Patent Office

DAVID W. DE FOREST, OF BROOKLYN, NEW YORK.

Letters Patent No. 69,546, dated October 8, 1867.

IMPROVEMENT IN TRACE-FASTENING.

*The Schedule referred to in these Letters Patent and making part of the same.*

TO ALL WHOM IT MAY CONCERN:

Be it known that I, D. W. DE FOREST, of Brooklyn, in the county of Kings, and State of New York, have invented a new and "Improved Fastener for Trace and other Straps," &c.; and I do hereby declare that the following is a full, clear, and exact description thereof, which will enable those skilled in the art to make and use the same, reference being had to the accompanying drawings, forming part of this specification.

The present invention relates to a fastener more particularly intended for trace-straps to the whiffle-trees of carriages, although by its construction it is applicable to many other purposes as well, but in the present instance will be described with reference to its use as a trace-fastener.

The invention consists in constructing the head of the shank or stem of the fastener with a receding end, or so diminished in shape that the trace may be slipped over it with facility and ease; also, countersinking the under side of the head, and providing the bottom end of the pin with a head, so that when the pin is raised the trace will not come in contact with the head when placing it over the head of the fastener, thus preventing the wearing and cutting out of the hole of the trace by the edge of the hole catching against the head of the pin otherwise. In the accompanying plate of drawings my improved fastener is illustrated—

Figure 1 being an end view of the same, and

Figure 2 a section taken in the plane of the line $x$ $x$, fig. 1, through the fastener, and through a portion of the whiffle-tree at the end where the fastener is attached.

Similar letters of reference indicate corresponding parts.

A, in the drawings, represents the end of the whiffle-tree to a vehicle, at which end my improved trace-fastener B is applied, and secured by screwing it with its screw-shank or stem C into the same. This fastener B projects from the end of the whiffle-tree, and at such projecting end is rounded off upon its under side, $C^2$, from its upper edge down, with an eye or passage, D, through its thickness. In this eye D a bolt, E, headed at each end, is arranged to play, so that it can be freely moved in and through the same, from the shoulder $a$ at one end to the shoulder $b$ at its other, this bolt being arranged to move in a direction across the width of the trace-strap and of the slit cut on the same for passing it over the projecting end to the fastener.

To place the trace-strap on the fastener B, first draw up the bolt E, bringing its lower head, $b'$, into the countersink I of the eye D, when, passing the trace-strap down over it, force it around the rounded head to the fastener to the part H of the same, where, by the then dropping of the said bolt E, it is secured and held, as is obvious. To remove the trace, lift the bolt as before, and draw the trace around the rounded edge of the projection, and thence over the pin or bolt, until it is free from the same. By countersinking the head to the bolt in the eye, it offers no obstruction to working the trace over the fastener.

I claim as new, and desire to secure by Letters Patent—

The construction of the head of the shank or stem of the fastener, with its under side countersunk to receive the head of the pin, in combination with the same, substantially in the manner and for the purpose as herein specified.

The above specification of my invention signed by me this 7th day of May, 1867.

DAVID WM. DE FOREST.

Witnesses:
ALBERT W. BROWN,
ALEX. F. ROBERTS.